March 1, 1927.
H. O. HEM
1,619,123
INTEGRATING SCALE
Original Filed May 31, 1924    3 Sheets-Sheet 1
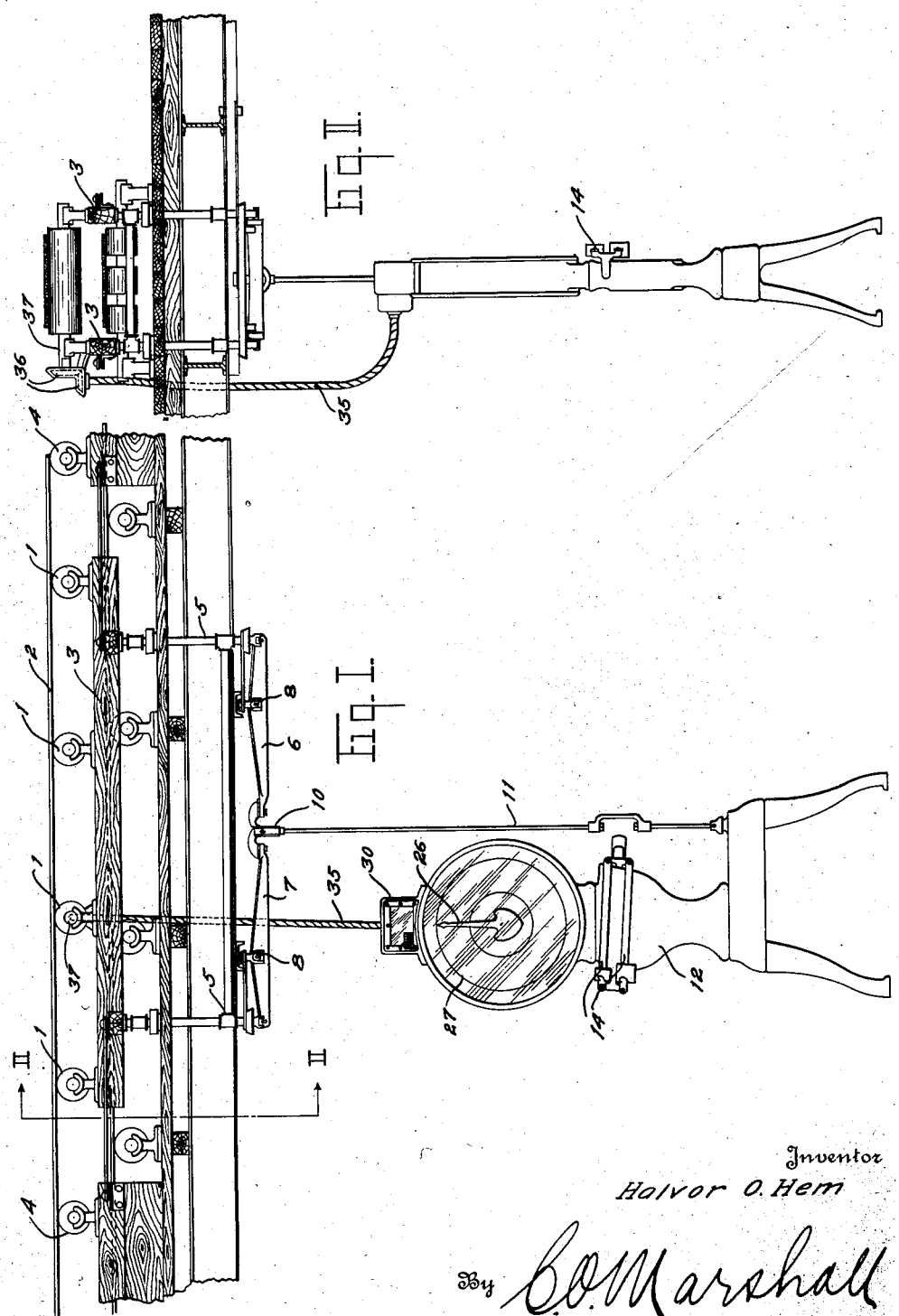
Inventor
Holvor O. Hem
By C.O. Marshall
Attorney

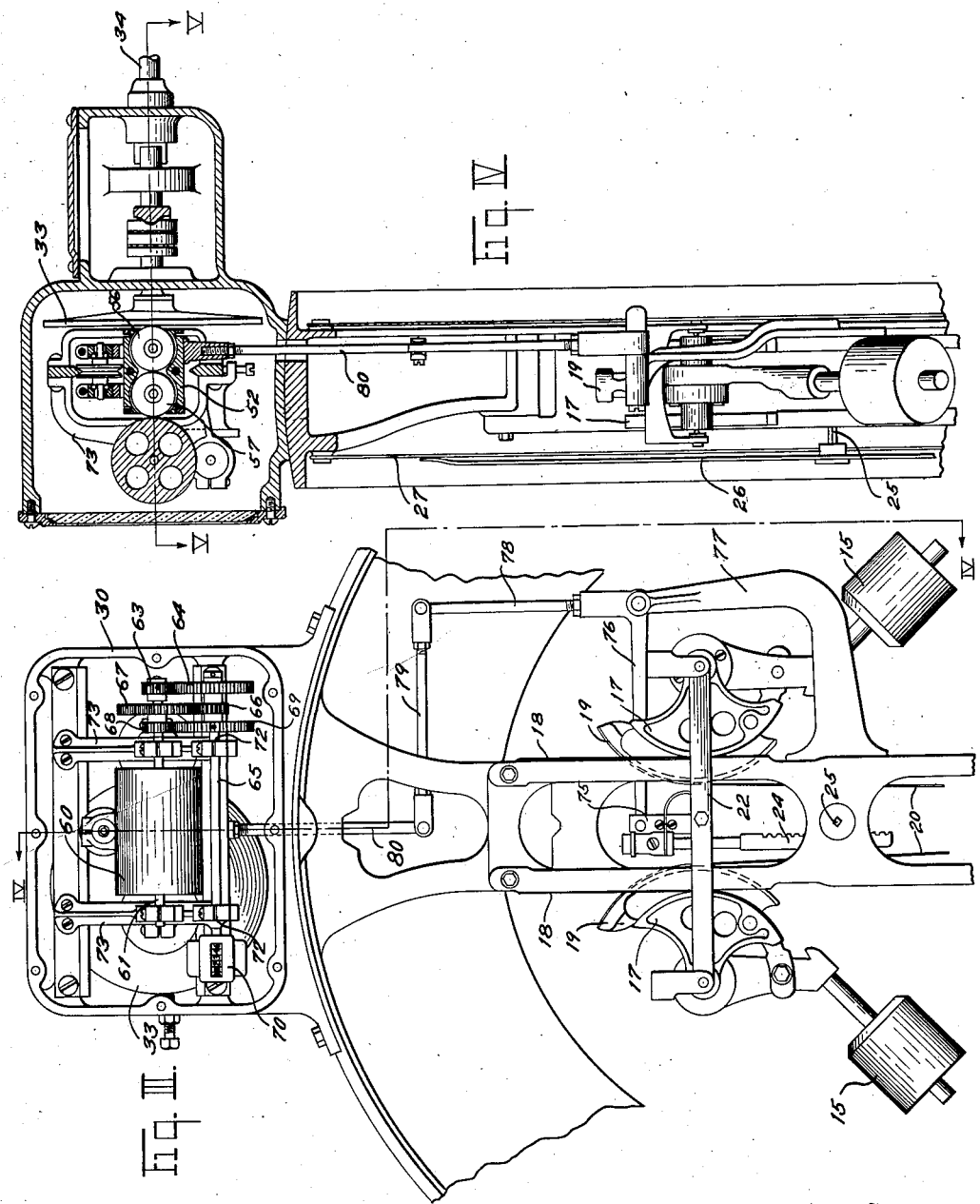

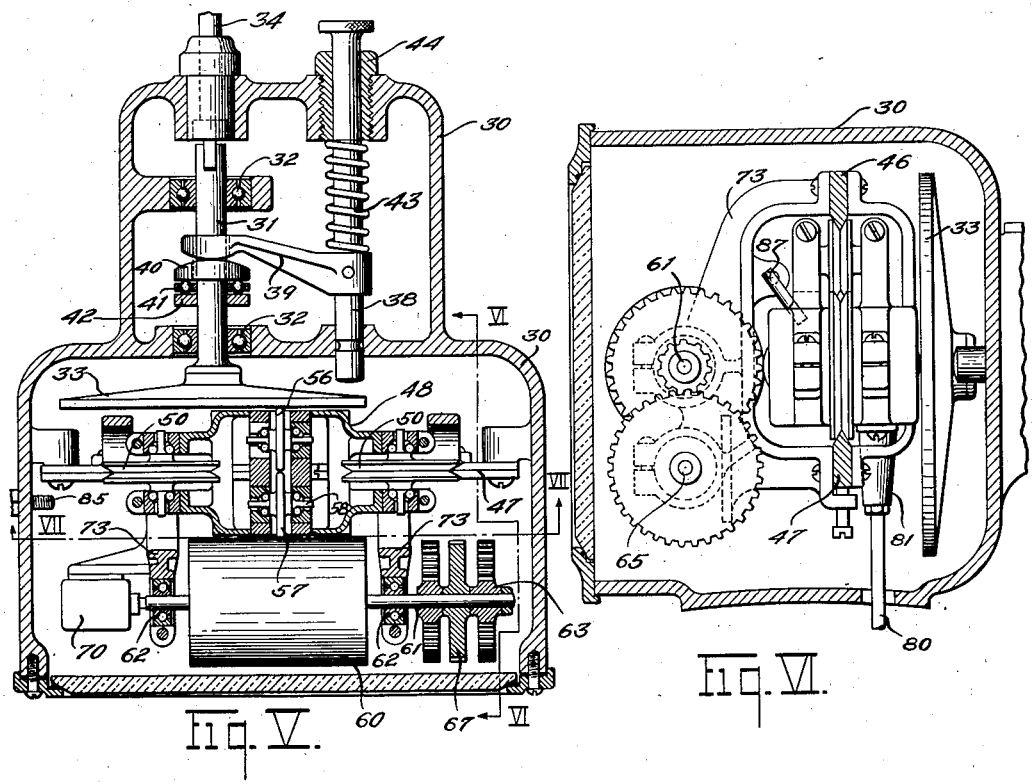
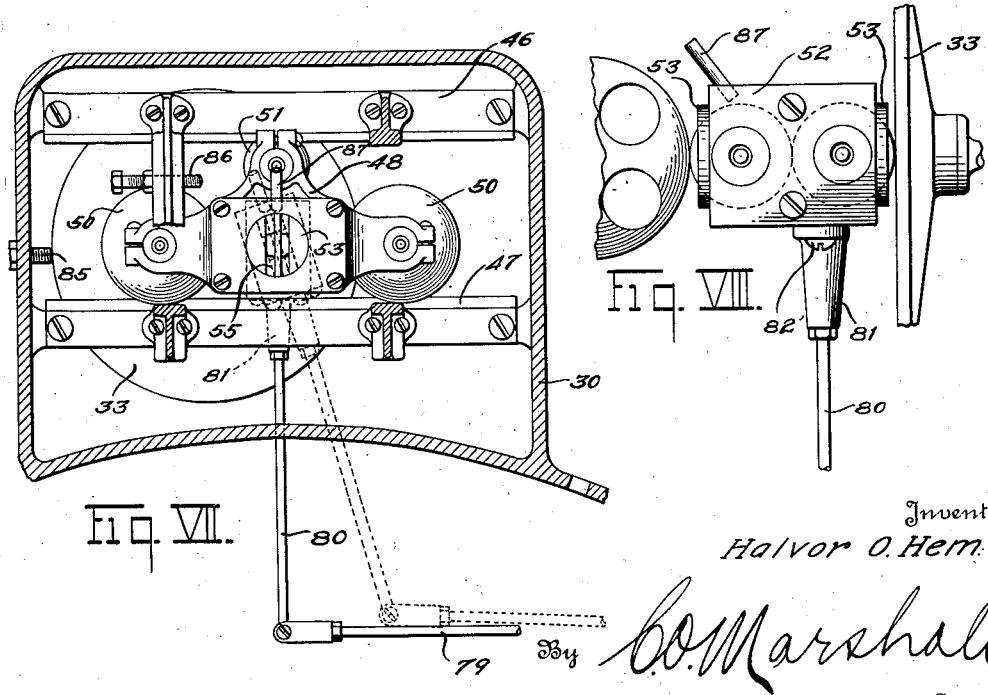

Patented Mar. 1, 1927.

1,619,123

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

INTEGRATING SCALE.

Application filed May 31, 1924, Serial No. 716,988. Renewed July 26, 1926.

This invention relates to weighing scales, and more particularly to instruments for weighing and indicating the total amount of material which flows or moves over the scale in any period of time.

One object of my invention is the provision of an integrating mechanism in combination with a weighing machine which is capable of integrating two variable quantities—i. e., weight and speed.

Another object is the provision of an integrating mechanism of this character which is so constructed that the various moving parts always remain in rolling contact, thus eliminating slippage and practically eliminating friction, which would otherwise materially affect the accuracy of the machine.

Another object is the provision of an integrating instrument of this character in which no stress is placed upon the weighing mechanism which can affect the accuracy of the weight indication.

Still another object of my invention is the provision of an integrating device which is constructed of few movable parts and assembled into a small, compact unit which may be attached to a weighing scale without materially changing the weighing mechanism.

And still another object is to provide an integrating device that will operate in conjunction with a weighing machine and which is entirely automatic in its operation.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a conveyer belt and a weighing scale showing my invention attached thereto;

Figure II is a transverse sectional view taken substantially on the line II—II of Figure I;

Figure III is an enlarged detail elevational view of the integrating mechanism showing the method of attachment to a weighing scale;

Figure IV is a transverse sectional view taken substantially on the line IV—IV of Figure III;

Figure V is a sectional view taken substantially on the line V—V of Figure IV showing various elements of the integrating mechanism;

Figure VI is an enlarged vertical sectional view taken substantially on the line VI—VI of Figure V;

Figure VII is a vertical sectional view taken on the line VII—VII of Figure V; and Figure VIII is an enlarged fragmentary detail view of part of the integrating mechanism.

The particular embodiment of my invention illustrated in the accompanying drawings is adaptable for use with a traveling belt conveyer for the purpose of determining or integrating the total amount of material transported by the conveyer belt in any period of time.

It is obviously necessary that a portion of the conveyer belt be connected to a weighing scale in such a way that any load upon the conveyer belt will be indicated upon the weighing scale. For this purpose I have provided a plurality of rollers 1 which support a conveyer belt 2, the rollers being mounted upon a pair of substantially parallel beams 3, the beams being supported upon a rectangular frame 5, preferably constructed of piping to facilitate assembling the structure. The frame 5 is mounted upon a lever mechanism comprising a pair of levers 6 and 7 which are fulcrumed intermediate their ends, as at 8, their inner ends being connected together, as at 10, and a rod 11 extending downwardly from the point of connection of the levers is operatively connected to a weighing scale 12 of a well known type employing a pendulum counterforce system, more particularly described and claimed in the patent to Hapgood No. 1,203,611. The scale will only be described in such detail as to show the application of my invention thereto. The rod 11 is connected to a transversely extending lever (not shown) in the base, which in turn is connected to the beams 14 and the pendulums 15, shown in Figure III.

The pendulums are provided with fulcrum sectors 17 supported by flexible bands or ribbons 18, and fixed between the fulcrum sectors are power sectors 19 connected by flexible bands 20 to an equalizer bar (not shown), which is pulled downwardly when a load is placed upon the conveyer belt.

This downward movement results in an outward and upward movement of the pendulums to position in which the load is counterbalanced. The pendulums are connected together by means of parallel bars 22 and the bars 22 are connected to a rack bar 24 which meshes with a pinion (not shown) mounted on a shaft 25. An indicating hand 26 is also mounted upon the shaft 25 and is adapted to swing over a chart 27 to indicate the weight of a load upon the conveyer belt.

The integrating mechanism of my invention is suitably encased and supported in a housing 30 which is secured to the housing of the scale. A horizontal shaft 31 is suitably journaled in anti-friction bearings 32 which are supported by inwardly projecting portions of the housing 30. One end of the shaft 31 terminates in an enlarged circular disk 33 and its other end is connected by means of a tongue and groove coupling to a flexible cable or shaft 34. This flexible shaft is loosely housed within a flexible tube 35 and is connected to one of a pair of miter gears 36, the other gear being fixedly secured to one end of a shaft 37 on which is mounted one of the rollers 1 which supports the conveyer belt 2. By this means the flexible shaft 34, the shaft 31 and the disk 33 are rotated through the miter gearing 36 whenever the rollers 1 are rotated by the conveyer belt 2. Journaled within the housing 30 adjacent to and substantially parallel with the shaft 31 is a rod 38 upon which is fixedly secured a finger 39 having its free end bifurcated to straddle the shaft 34 and bear upon a disk 40 which forms one portion of an anti-friction bearing, the disk 42 of which is fixed to the shaft 31. An expansive spring 43 surrounds the rod 38 between the finger 39 and a bushing 44 fixed in a boss in the housing 30 and serves to urge the finger 39 into contact with the bearing disk 40, thereby exerting a pressure on the disk 33.

Transversely arranged within the housing 30 is a pair of parallel bars 46 and 47, the facing portions of the bars being knife edged, and positioned between the bars 46 and 47 is a skeleton frame or carriage 48 having a plurality of bosses in which are journaled in suitable anti-friction bearings the V grooved disks 50 which are supported upon and may roll along the knife edge of the bar 47. Another V grooved disk 51 of lesser diameter engages and is adapted to travel along the knife edge of the bar 46. The bars 46 and 47 thus serve as guides.

Located centrally of the skeleton frame 48 and arranged to swing on an axis parallel to the axes of the grooved disks 50 and 51 is a cage 52 having reduced circular portions 53 which are journaled in the frame 48. The cage 52 has an opening 55 therein which receives a pair of rollers 56 and 57 of equal diameters journaled in anti-friction bearings 58, the axis of rotation of said rollers being at right angles to the axis of rotation of the enlarged disk 33. Positioned adjacent to the frame 48 with its axis parallel to the bars 46 and 47 is a hollow drum or cylinder 60 fixedly mounted upon a shaft 61 which is journaled in anti-friction bearings 62, the periphery of the cylinder being at all times in contact with the periphery of the roller 57. As is clearly shown in Figure V, the peripheries of the rollers 56 and 57 are constantly in rolling contact and also in contact respectively with the plane surface of the disk 33 and the periphery of the cylinder 60.

Fixed upon the extreme end of the shaft 61 is a pinion 63 meshing with a comparatively large gear wheel 64 loosely mounted for rotation upon a shaft 65, and fixed to said gear wheel 64 is a pinion 66 which meshes with a gear wheel 67 loosely mounted for rotation on the shaft 65. A third pinion 68 fixed to the gear wheel 67 for rotation therewith meshes with a third gear wheel 69 fixed upon the shaft 65. An integrating or counting device 70 is operatively connected to the shaft 65 so as to be actuated through the medium of the above described gear train whenever the drum 60 is rotated. My invention does not reside in the integrating or counting device per se, as any suitable integrating device may be incorporated in this mechanism, but in the specific embodiment of my invention herein described a counter of the well known "Veeder" type is employed.

The shafts 61 and 65 are respectively journaled in anti-friction bearings 62 and 72 carried by a forwardly projecting bracket 73 secured by means of a plurality of screws to the bars 46 and 47.

From the foregoing description it is apparent that the frame 48, in which is journaled the cage 52 provided with the disks 50 and 51, is free to move transversely on the bars 46 and 47, the extent of such movement being limited only by the walls of the housing 30.

In order to successfully integrate or totalize moving and variable weights, the integrating mechanism must be controlled by the load-offsetting or weighing mechanism. It is desirable, however, that the controlling device, if possible, be so designed as not to affect the accuracy of the weighing mechanism. To this end I have provided the following mechanism: A member 75 is secured in any suitable manner to the compensating bars 22, and pivotally connected to said member is one arm of a bell crank lever 76 which in turn is pivoted to the upwardly projecting arm of a bracket 77 fixed to the pendulum supporting frame 21. The other arm 78 of the bell crank lever is pivotally connected by means of a link 79 to the lower extremity of a rod 80 which is threaded into a block 81 fixedly secured by means of screws 82 to the member 52. With the parts thus assembled, movement of the pendulums to offset any load upon the conveyer belt will be transmitted through the bell crank lever 76 and linkage to oscillate the cage 52 about an axis perpendicular to the face of the disk 33. As long as there is no rotation of the disk 33 the cage 52 will act as though pivoted on a fixed axis, but during rotation of said disk, through its connection to one of the rollers supporting the conveyer belt, rotation will be imparted to the rollers 56 and 57 which will move radially of the disk 33 until the plane of the roller 56 is perpendicular to the radius of the disk 33 at the point of contact—i. e., to a position in which there is no horizontal component of force acting on the roller 56. The rollers 56 and 57 and cage 52 being journaled in the carriage 48, the carriage and associated mechanism will be moved as a unitary structure to a position in which the rod 80 is substantially vertical. When a load is moved by the conveyer belt onto that portion supported by the scale lever mechanism, the pendulums 15 move upwardly to counterbalance the load, at the same time causing the rod 80 to swing to the right, thus tilting the plane of the roller 56 in a counterclockwise direction. As this movement takes place while the disk 33 is being rotated by movement of the conveyer belt, the rollers 56 and 57 are caused by the rotation of the disk 33 to move away from the axis of rotation of the disk 33. The further from the axis of rotation of the disk 33 the point of contact with the roller 56, the greater the speed of the roller and the greater the speed that is transmitted to the cylinder 60 and that of the integrating counter 70.

After a load passes over the portion of the conveyer which is supported by the scale levers, the pendulums 15 move downwardly to compensate for the decrease in load, and the rod 80 being swung to the left tilts the plane of the rollers 56 and 57 in a clockwise direction, setting up a horizontal component of force tending to move said rollers to the left, toward the axis of the disk 33, thereby decreasing the speed of the rollers 56 and 57 and resulting in a corresponding decrease in speed of the cylinder 60 and a consequent decrease in the speed of the integrating device 70.

While the rollers 56 and 57 and carriage 48 do not move or respond instantaneously to an increase or decrease in the load on the conveyer belt, they follow it very closely and the slight "lag" at the beginning of an increase in the load is exactly compensated by the "lag" at the beginning of a decrease.

If the load is entirely removed from the conveyer the rollers 56 and 57 approach the axis or center of the driving disk 33, and upon reaching this position the rollers 56 and 57 cease rotation and no further registration on the counting device 70 will take place.

In order to prevent the roller 56 from passing to the left of the center of the disk 33 I have provided an adjustable stop 85 which is threaded into the wall of the housing 30 and extends inwardly into position to engage the carriage 48 should it move too far to the left.

When the roller is in exact central position on the disk 33 it may be turned by the swinging of the rod 80 without setting up the component of force which would move it outwardly over the face of the disk. This component of force comes into existence only when the roller 56 is not at the exact center of the disk. In order to prevent the roller from remaining at the center of the disk as the rod 80 is swung to the right under the influence of a load on the scale, I have provided an abutment 86 which is adjustably mounted on the framework supporting the tracks 46 and 47, the abutment 86 being in position to be engaged by a projection 87 fixed to the cage 52 when the rod 80 swings to the right. When the abutment 86 and the projection 87 are in engagement they constitute a fulcrum, the reaction against which moves the cage 52 to the right, thus moving the roller 56 away from the center of the disk. As soon as the roller reaches the exact center of the disk it will immediately take up the movement to the right and the projection 87 will move out of engagement with the abutment 86. In the actual use of the device these members will seldom be brought into engagement, as there will usually be some load on the scale.

In order to get a clear conception of the utility of my invention, it must be understood that the integrating mechanism does not prevent the weighing mechanism from assuming a position of balance. In an automatic scale the weighing mechanism is moved to a position of balance by the unbalanced load and as position of balance is approached the unbalanced load becomes less and less, until, when position of balance is reached, the unbalanced load is zero. The force available to move the weighing mechanism through the final part of its movement is reduced very nearly to zero before balanced position is reached, so that if the weighing mechanism were required to drag the roller 56 over the face of the disk 33 it would fail to reach balanced position. With the applicant's invention, however, as soon as the slightest swing is imparted to the rod 80 the roller 56 immediately moves over to a position in which it and the rod 80 are in a plane perpendicular to the radius of the disk at the point of contact. There is thus a slight damping effect on the movement of the automatic load-counterbalancing mechanism and a slight lag in the operation of the integrating mechanism, but there is no effective drag on the automatic load-counterbalancing mechanism.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism, a commodity support operatively connected thereto, means for moving commodities over said commodity support, a disk, means for rotating said disk at a speed proportional to the speed of commodities over said support, a roller having a plane perpendicular to the face of said disk, means supporting said roller with its periphery in engagement with the face of said disk, the supporting means being arranged to permit lateral movement of said roller over the face of said disk, and means connected with said weighing mechanism for turning said roller about an axis perpendicular to the face of said disk.

2. In a device of the class described, in combination, weighing mechanism, a commodity support operatively connected thereto, means for moving commodities over said commodity support, a disk, means for rotating said disk at a speed proportional to the speed of commodities over said support, a roller having a plane perpendicular to the face of said disk, means supporting said roller with its periphery in engagement with the face of said disk, the supporting means being arranged to permit lateral movement of said roller over the face of said disk, means connected with said weighing mechanism for turning said roller about an axis perpendicular to the face of said disk, an integrating device, and means for operating said integrating device from said roller.

3. In a device of the class described, in combination, automatic weighing mechainsm, a commodity support operatively connected to said weighing mechanism, means for passing commodities over said support, an integrating device including a rotatable member having a flat face at an angle to its axis of rotation, a roller having its periphery engaged with said face, and means connected to said weighing mechanism for tilting the axis of said roller out of parallelism with a line lying in the face of said rotatable member and extending from its center to its point of engagement with said roller.

4. In a device of the class described, in combination, automatic weighing mechanism, a commodity support operatively connected to said weighing mechanism, means for passing commodities over said support, an integrating device including a rotatable member having a flat face at an angle to its axis of rotation, a roller having its periphery engaged with said face, means connected to said weighing mechanism for tilting the axis of said roller out of parallelism with a line lying in the face of said rotatable member and extending from its center to its point of engagement with said roller, and means for so supporting said roller that it may move toward or away from the center of rotation of said rotatable member.

5. In a device of the class described, in combination, automatic weighing mechanism, a commodity support, means for moving commodities over said support, an integrating device including a rotatable member having a flat face at an angle to its axis of rotation, a roller having its periphery in engagement with said face, an arm connected to said roller and extending in a direction at an angle to the axis of rotation of said rotatable member, means connected to said automatic weighing mechanism for moving the extending end of said arm in a direction parallel to the said face of said rotatable member, and means for holding said roller in engagement with the face of said rotatable member while permitting it to move toward or away from the center of rotation of said rotatable member and thereby follow the movement of the extending end of said arm.

6. In a device of the class described, in combination, automatic weighing mechanism, a commodity support connected thereto, means for causing commodities to be supported by said support for appreciable periods of time, a rotatable disk, means for imparting rotation to said disk at speeds inversely proportional to the length of the periods during which commodities are supported by said support, a roller, means for supporting said roller with its periphery in engagement with the face of said disk while permitting said roller to be tilted about an axis perpendicular to the face of said disk, said supporting means also permitting said roller to move radially over the face of said disk, and means connected to said weighing mechanism for tilting said roller.

7. In a device of the class described, in combination, a rotatable disk, a frame tiltable about an axis perpendicular to the face of said disk, a roller mounted in said frame having its periphery engaged with the face of said disk, means supporting said frame for movement radially of said disk, an arm fixed to said frame and extending substantially parallel to the face of said disk and perpendicular to the radius of movement of said frame, means for moving the extending end of said arm, an integrating device, and transmission mechanism between said roller and said integrating device.

8. In a device of the class described, weighing mechanism, a rotatable disk, a frame tiltable about an axis perpendicular to the face of said disk, a roller mounted in said frame having its periphery engaged with the face of said disk, means supporting said frame for movement radially of said disk, an arm fixed to said frame and extending substantially parallel to the face of said disk and perpendicular to the radius of said disk and perpendicular to the radius of said frame, means for moving the extending end of said arm connected to said weighing mechanism, an integrating device, and transmission mechanism between said roller and said integrating device.

9. In a device for weighing material while in motion, a movable member whose displacements are proportional to the weights of successive portions of material, a rotary member having speed proportional to the rate of movement of the successive portions of material, said rotary member having a flat face at an angle to its axis of rotation, a roller engageable with said face, and means controlled by the displacement of said movable member whereby power derived from the movement of said rotary member is caused to shift said roller toward or away from the center of rotation of said rotary member.

10. In a device for weighing material while in motion, a movable member whose displacements are proportional to the weights of successive portions of material, a disk having speed proportional to the rate of movement of the successive portions of material, said disk having a face at an angle to its axis of rotation, a roller engageable with said face, and means controlled by the displacement of said movable member whereby power derived from the movement of said disk is caused to shift said roller toward or away from the center of rotation of said disk.

HALVOR O. HEM.